`US010518596B2`

(12) United States Patent
Aitoh et al.

(10) Patent No.: US 10,518,596 B2
(45) Date of Patent: Dec. 31, 2019

(54) JOINT

(71) Applicant: NIPPON STEEL CORPORATION, Tokyo (JP)

(72) Inventors: Takahiro Aitoh, Tokyo (JP); Takeshi Kawachi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 5 days.

(21) Appl. No.: 15/517,734

(22) PCT Filed: Oct. 7, 2015

(86) PCT No.: PCT/JP2015/078523
§ 371 (c)(1),
(2) Date: Apr. 7, 2017

(87) PCT Pub. No.: WO2016/056601
PCT Pub. Date: Apr. 14, 2016

(65) Prior Publication Data
US 2017/0305228 A1    Oct. 26, 2017

(30) Foreign Application Priority Data
Oct. 10, 2014   (JP) .................................. 2014-209256

(51) Int. Cl.
*B60G 7/00*       (2006.01)
*B21D 5/16*       (2006.01)

(52) U.S. Cl.
CPC .............. *B60G 7/001* (2013.01); *B21D 5/16* (2013.01); *Y10T 29/49622* (2015.01); *Y10T 403/32918* (2015.01); *Y10T 403/7182* (2015.01)

(58) Field of Classification Search
CPC ..... B21D 5/16; B60B 2900/311; B60G 7/001; E04B 2001/405; F16D 3/387;
(Continued)

(56) References Cited

U.S. PATENT DOCUMENTS

| 4,034,946 A * | 7/1977 | Zimmer, Jr. | ............ F21V 21/30 |
| | | | 403/157 |
| 4,725,073 A * | 2/1988 | Sano | ...................... B60G 7/001 |
| | | | 280/124.128 |

(Continued)

FOREIGN PATENT DOCUMENTS

| JP | 11034912 A * | 2/1999 | ............. B60G 11/12 |
| JP | 2000-108624 A | 4/2000 | |

(Continued)

OTHER PUBLICATIONS

"Theory: Plate Equation." eFunda. Aug. 30, 2013, [online], [retrieved on Oct. 10, 2018] Retrieved from the Internet <URL: https://web.archive.org/web/20130830092733/http://www.efunda.com/formulae/solid_mechanics/plates/theory.cfm>.*

(Continued)

*Primary Examiner* — Josh Skroupa
(74) *Attorney, Agent, or Firm* — Birch, Stewart, Kolasch & Birch, LLP (57) ABSTRACT

A joint provided with a base part 12, a pair of side parts 14, 14 extending from the two end parts of the base part 12 in the first direction D1 to the same side in the second direction D2 vertical to the first direction D1, the pair of side parts 14, 14 being formed with fastening holes 14H at the center in a third direction D3 vertical to both the first direction D1 and second direction D2, and a closed part 16 formed between the pair of side parts 14, 14 as an extended region of the base part 12 and pair of side parts 14, 14 at least at one end in the third direction D3.

5 Claims, 3 Drawing Sheets

(58) Field of Classification Search
CPC ......... F16D 2023/141; Y10T 29/49622; Y10T 403/32918; Y10T 403/32926; Y10T 403/57; Y10T 403/7182; Y10T 403/7188
USPC .......... 403/157, 158, 300, 398, 399; 52/715; 29/897.2
See application file for complete search history.

(56) References Cited

U.S. PATENT DOCUMENTS

| | | | | | |
|---|---|---|---|---|---|
| 5,301,977 | A | * | 4/1994 | Schlosser | B62D 17/00 280/86.75 |
| 5,775,719 | A | * | 7/1998 | Holden | B60G 7/02 280/86.75 |
| 6,536,179 | B2 | * | 3/2003 | Little | E04B 1/2608 52/715 |
| 6,808,333 | B2 | * | 10/2004 | Friesen | F16C 11/045 403/157 |
| 7,360,774 | B2 | * | 4/2008 | Saieg | B60G 7/001 280/124.116 |
| 8,695,296 | B2 | * | 4/2014 | Bergman | E04B 9/366 52/715 |
| 9,409,220 | B2 | * | 8/2016 | Henniger | B21D 5/16 |
| 2011/0025010 | A1 | * | 2/2011 | Kawata | B60G 7/001 29/897.2 |
| 2014/0008886 | A1 | | 1/2014 | Ueno et al. | |
| 2015/0097350 | A1 | | 4/2015 | Shirakami et al. | |

FOREIGN PATENT DOCUMENTS

| | | |
|---|---|---|
| JP | 2007-76547 A | 3/2007 |
| JP | 2007-76615 A | 3/2007 |
| JP | 2010-76473 A | 4/2010 |
| JP | 4589775 B2 | 12/2010 |
| JP | 2014-159289 A | 9/2014 |
| KR | 20-1998-0061526 U | 11/1998 |

OTHER PUBLICATIONS

International Search Report for PCT/JP2015/078523 dated Dec. 15, 2015.
Written Opinion of the International Searching Authority for PCT/JP2015/078523 (PCT/ISA/237) dated Dec. 15, 2015.
Korean Office Action and English translation for corresponding Korean Application No. 10-2017-7009023, dated Sep. 7, 2018.

* cited by examiner

FIG. 5

JOINT

TECHNICAL FIELD

The present invention relates to a joint designed for greater rigidity without increasing the wall thickness.

BACKGROUND ART

The joints included in link mechanisms used in suspensions in automobiles, ships, aircraft, and various industrial machinery mainly serve as mechanisms for positioning wheels and other members, so are required to have a certain extent of rigidity with respect to application of force from these members.

As an example of a link including such a joint, a vehicular-use I-suspension arm comprised of a main body part (rod) made of a steel sheet formed into a tubular shape and a pair of connecting parts fastened to the two end parts of this main body part is known (see Japanese Patent Publication No. 2010-76473A). One of the connecting parts is usually a bracket-type joint. This joint includes a base part connected to the rod end part and a pair of side parts extending from the outermost parts of the base part in the rod width direction to the opposite sides from the rod. Note that, the base part and the side parts are connected and fastening holes are formed in the side parts of the joint.

SUMMARY OF INVENTION

Technical Problem

In the vehicular use I-suspension arm disclosed in Japanese Patent Publication No. 2010-76473A, the joint (bracket) becomes the weak part since it is relatively low in strength against application of force from the wheels. For this reason, when a joint receives for example a compressive force (force in direction in which side parts extends), there is a high possibility that the side parts of the joint will deform out-of-plane, in other words, the rigidity required by the joint as a whole is liable to be unable to be obtained.

Therefore, it may be considered to make the walls of the joint (bracket) uniformly thicker, but such thickening of the walls would lead to the problems of increased weight of the link as a whole and an accompanying rise in cost.

The present invention was made in consideration of this situation and has as its object the provision of a joint realizing higher rigidity without relying on increased wall thickness.

Solution to Problem

The inventors studied how to realize higher rigidity of a joint as a whole while suppressing deformation of the side parts of the joint due to application of force from the wheels or other members without uniform thickening of the walls of the joint.

As a result, the inventors obtained the discovery that when forming a closed part between a pair of side parts at least at a base part side, by setting a suitable width of this closed part (dimension of closed part in longitudinal direction of side parts), it is possible to obtain a joint resistant to deformation of the side parts at the time of application of force from the wheels etc., in other words, able to exhibit excellent rigidity, without making the joint uniformly greater in wall thickness.

The inventors completed the present invention based on the above discoveries. The gist is as follows:

[1] A joint comprising a base part, a pair of side parts respectively extending from two end parts of the base part in a first direction to the same side of a second direction vertical to the first direction and formed with fastening holes at center parts in a third direction vertical to both of the first direction and second direction, and a closed part formed between the pair of side parts as an extended region of the base part and the pair of side parts at least at one end part in the third direction.

[2] The joint according to [1], wherein a length L1 from a base part side end part of the side part in the second direction to a center position of the fastening hole and a smallest length L2 of the closed part in the second direction satisfy the relationship:

$$0.1 \times L1 < L2 < 1.0 \times L1 \qquad (1)$$

[3] The joint according to [1] or [2], wherein a thickness t1 of the base part and a thickness t2 of the closed part satisfy the relationship $$t2 > t1 \qquad (2)$$

[4] The joint according to any one of [1] to [3], wherein the closed part is formed at the two end parts of the side parts in the third direction.

[5] The joint according to any one of [1] to [4], obtained by a method of production of a joint comprising a blank bending step of bending at least one end part in the third direction of a blank comprised of a metal sheet to one side in the second direction to form an intermediate member of an upside down L-shape or upside down U-shape viewed from the side and a joint forming step of using press-forming die comprising a die provided with a pad for pressing the intermediate member, a punch arranged facing the die and provided with an inner pad supported to be able to move in a clamping direction, and an out-of-plane deformation suppressing tool of the closed part arranged facing a side surface of the punch so as to bend the two end parts of the intermediate member in the first direction to the one side of the second direction.

[6] The joint according to any one of [1] to [4] formed by at least one of one-piece molding, press-forming, powder forming, casting, welding, and bonding.

Advantageous Effects of Invention

In the joint according to the present invention, the means for forming the closed part between the pair of side parts is improved. As a result, according to the joint according to the present invention, it is possible to realize higher rigidity without uniformly increasing the wall thickness.

BRIEF DESCRIPTION OF DRAWINGS

FIGS. 4(a) and 4(b) are side views showing an apparatus used in a blank bending step, wherein FIG. 4(a) shows the state before starting bending and FIG. 4(b) shows the state after finishing bending.

DESCRIPTION OF EMBODIMENTS

Joint (Suspension Link Bracket)

Below, referring to FIGS. 1 and 2, an embodiment of the present invention (joint, in particular a suspension link bracket) will be explained. In the present embodiment, the "first direction" means the direction shown by the notation D1 in FIGS. 1 and 2, the "second direction" means the direction shown by the notation D2 in FIGS. 1 and 2 (direction vertical to first direction D1), and the "third direction" means the direction shown by the notation D3 in FIGS. 1 and 2 (direction vertical to both first direction D1 and second direction D2).

Note that, while not shown, a suspension link (control link) is generally comprised of a pipe-shaped rod made of steel sheet and brackets or tubes attached to the two end parts of the rod. A link mechanism is configured with the parts to be connected with through the brackets (tubes).

Figure 1:
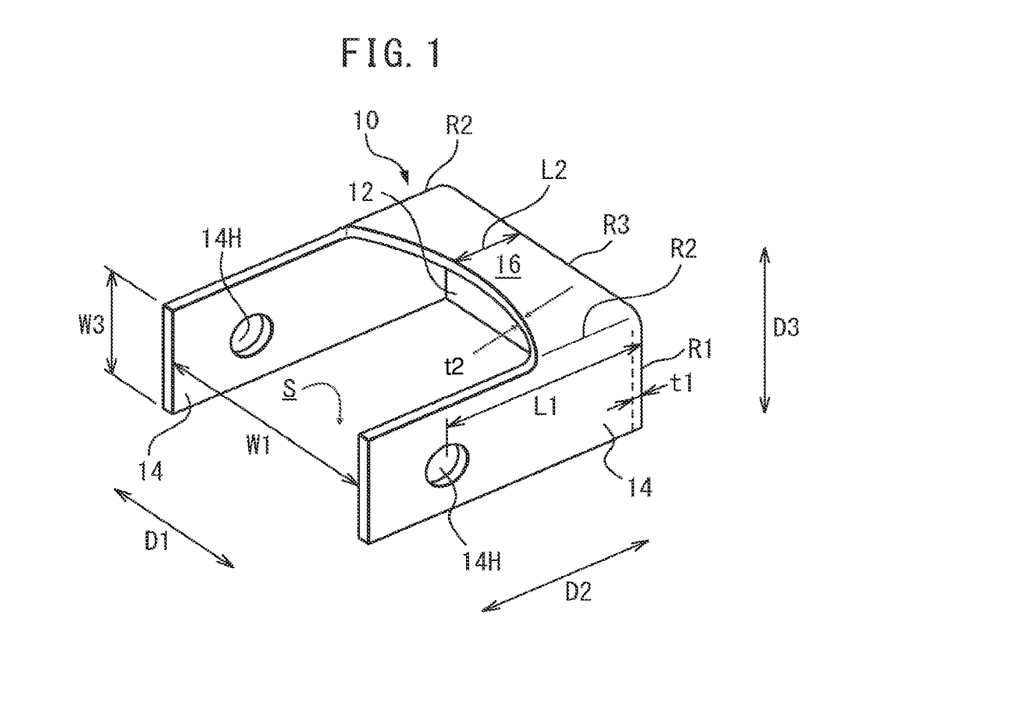
FIG. 1 is a perspective view showing a joint (bracket) according to an embodiment of the present invention.

FIG. 1 is a perspective view showing a suspension link bracket 10 as one example of a joint according to an embodiment of the present invention. The bracket 10 is comprised of a base part 12, a pair of side parts 14, 14, and a closed part 16.

The base part 12 is attached to a component of the suspension link comprised of a not shown rod. Note that when attaching the base part 12 to the rod, it may be attached to just one end of the rod of course and may be attached to the two ends of the rod.

The pair of side parts 14, 14 extend from the two end parts of the base part 12 in the first direction D1 to the same side in a second direction D2 vertical to the first direction D1 (in FIG. 1, bottom left side) while connected to the base part 12. Further, the pair of side parts 14, 14 are formed with fastening holes 14H, 14H at the center parts in the third direction D3. The fastening holes 14H are bolt holes for bolting in a state with, for example, bushes (not shown) held inside the bracket 10.

The closed part 16 is formed between the pair of side parts 14, 14 and at least one end part in the third direction D3 (in FIG. 1, only the top end part) as an extended region of the base part 12 and pair of side parts 14, 14. Here, the "as an extended region" means the closed part 16 is attached to the base part 12 and the side parts 14 by bonding, welding, or other various connecting methods of course and also including the members 12, 14, and 16 being produced from the same material.

At the boundary parts of the base part 12 and the side parts 14, 14, ridgeline parts R1 are formed. Further, at the boundary parts of the side parts 14, 14 and the closed part 16, ridgeline parts R2 are formed. Furthermore, at the boundary part of the closed part 16 and the base part 12, a ridgeline part R3 is formed.

In the suspension link bracket 10 of the thus configured embodiment, since the closed part 16 is formed between the above described pair of side parts 14, 14, it is possible to suppress out-of-plane deformation of the pair of side parts 14, 14 to the first direction D1 due to force applied from the wheels etc. As a result, according to the suspension link bracket 10 of the present embodiment, it is possible to realize a higher rigidity without uniformly increasing the wall thickness.

Above, the most basic embodiment of the present invention was explained, but the present invention is not limited to this embodiment and can be modified in various ways within a scope not departing from the gist of the invention.

For example, the length L1 from a base part side end part of the side parts 14, 14 shown in FIG. 1 in the second direction D2 to a center position of a fastening hole and the smallest length L2 of the closed part 16 in the second direction D2 preferably satisfy the relationship of $$0.1 \times L1 < L2 < 1.0 \times L1 \qquad (3)$$

Normally, if a load is transmitted from the wheels etc. in the axial direction of a suspension arm, the vicinity of a bolted fastening hole 14H is liable to deform out of plane in the first direction D1, that is, to buckle. This out-of-plane deformation occurs easier the greater the length L1 from the base part 12 to a center position of a fastening hole 14H. For this reason, the length L2 in the second direction D2 of the closed part 16 required for suppressing this out-of-plane deformation is mainly determined by the relationship with the length L1.

Therefore, the inventors calculated the bracket rigidity value (kN/mm) in the case of changing the ratio (L2/L1) in the bracket shown in FIG. 1. Here, the "bracket rigidity value" is the value defined by the ratio of the load (kN) applied in the second direction D2 of the bracket shown in FIG. 1 and the amount of displacement (mm) of a side part 14 in the first direction D1 due to the same.

Table 1 shows the results of calculation relating to the relationship of the ratio (L2/L1) and the bracket rigidity value (kN/mm).

TABLE 1

| L2/L1 | 0 | 0.05 | 0.1 | 0.15 | 0.2 | 0.25 |
|---|---|---|---|---|---|---|
| Bracket rigidity value (kN/mm) | 68.9 | 70.3 | 74.8 | 80.8 | 86.3 | 91.2 |
| L2/L1 | 0.3 | 0.4 | 0.5 | 0.6 | 0.7 | 0.8 |
| Bracket rigidity value (kN/mm) | 94.3 | 98.6 | 100.5 | 101.7 | 102.5 | 103.0 |

As clear from Table 1, it is learned that starting from around when L2/L1 exceeds 0.1, the bracket rigidity value is strikingly improved compared with when L2/L1 is 0 (that is, when there is no closed part).

From such a viewpoint, by making the smallest length L2 larger than 0.1× of the length L1, it is possible to sufficiently secure the length in the second direction D2 of the closed part 16 formed between the pair of side parts 14, 14. This being said, it is possible to suppress the above-mentioned out-of-plane deformation. Due to this, it is possible to suppress out-of-plane deformation of the pair of side parts 14, 14 in the first direction D1 with respect to the application of force from the wheels etc. at a high level and in turn possible to realize higher rigidity at a high level without uniform increase of the wall thickness.

Note that, this effect is exhibited at a higher level by making 0.3×L1<L2. If making 0.4×L1<L2, it is exhibited at a still higher level, while if making 0.5×L1<L2, it is exhibited at an extremely high level.

On the other hand, by making the smallest length L2 smaller than 1.0× of the length L1, it is possible to sufficiently suppress deformation near the fastening holes 14H, 14H formed at the centers of the pair of side parts 14, 14 in the third direction D3 without the length in the second direction D2 of the closed part 16 formed between the pair of side parts 14, 14 being made excessively large. Due to this, it is possible to suppress deformation between the not shown rod connected through the bracket 10 and the part connected with at a high level.

Note that, if making the smallest length L2 not less than 1.0× the length L1, not only does the effect due to setting the smallest length L2 large (effect relating to suppression of out-of-plane deformation of side parts 14, 14) become relatively small, but also there is a possibility of the end part of the closed part 16 at the side opposite to the base part 12 and a part held inside the bracket 10 contacting each other. In this case, to avoid contact of the bracket 10 and that part, it is necessary to make the value of L1 further larger. As a result, this invites an increase in weight of the bracket 10 as a whole, so this is not preferable.

Further, by making the smallest length L2 smaller than 0.8× the length L1, it is possible to make the end part of the closed part 16 at the opposite side to the base part 12 side in the second direction D2 sufficiently far from the positions of the fastening holes 14H, 14H. Due to this, it is possible to effectively utilize the space in the second direction D2 where the closed part 16 is not formed in the space sandwiched between the two side parts 14, 14 of the bracket 10 without, in particular, limitation in the third direction D3. Therefore, the member held between the side parts 14, 14 can be made more diverse in structure.

Further, by making the smallest length L2 smaller than 0.6X the length L1, the bracket 10 comprised of the base part 12, pair of side parts 14, 14, and closed part 16 can be formed by not only welding the parts 12, 14, and 16 together, but also by one-piece molding. For this reason, the smallest length L2 is made smaller than 0.6X the length L1 so as to increase the degree of freedom of design.

Next, the radius of curvature of the inner circumferential surface r1 of the boundary part R1 between the base part 12 and the side parts 14, the radius of curvature of the inner circumferential surface r2 of the boundary part R2 of the side parts 14 and the closed part 16, the radius of curvature of the inner circumferential surface r3 of the boundary part R3 between the closed part 16 and the base part 12, the dimension W1 between the pair of side parts 14, 14 in the first direction D1, and the dimension W3 in the third direction D3 of the base part 12 preferably respectively satisfy the relationships of $$r1<0.1\times W1 \text{ and } r1<0.1\times W3 \tag{4}$$

$$r2<0.1\times W1 \text{ and } r2<0.1\times W3 \tag{5}$$

$$r3<0.1\times W1 \text{ and } r3<0.1\times W3 \tag{6}$$

In the space S in the bracket 10, for example, a bushing or other part is held. For this reason, the space S has to have a certain extent of volume. If one or more of any of the radii of curvature of the inner circumferential surface r1, r2, and r3 of the ridgeline parts R1, R2, and R3 are excessively large, the space S becomes smaller by that amount and the possibility of contact with a part held in the bracket 10 becomes higher. To avoid this contact, it may be considered to make the length L1 larger to sufficiently secure the space S, but an increase of the length L1, as explained above, invites a drop in the rigidity of the bracket 10, so is not preferable.

In view of this discovery, in the present embodiment, by satisfying all of the above relation (4) to the relation (6), it is possible to sufficiently secure the space S inside the bracket 10 without increasing the length L1 more than necessary. Therefore, according to the present embodiment, it is possible to secure a sufficient space S and in turn reliably hold a part inside the bracket 10 without causing a drop in the rigidity of the bracket 10.

Note that, when satisfying all of the relation (4) to the relation (6), it is possible to form the bracket 10 comprised of the base part 12, pair of side parts 14, 14, and closed part 16 not only by welding the parts 12, 14, 16 together, but also by one-piece molding. For this reason, when satisfying all of the above relation (4) to relation (6), the freedom of design increases.

Furthermore, in the example shown in FIG. 1, the thickness t1 of the base part 12 and the thickness t2 of the closed part 16 preferably satisfy the relation $$t2>t1 \tag{7}$$

The bracket 10 shown in FIG. 1, as explained above, can be formed without welding etc. by working a single material (metal sheet). In this case, when forming a bracket from a single metal sheet, if performing general drawing, the sheet thickness of the drawn part of the metal sheet (seamless recessed part formed by press machine) decreases compared with the thickness of the other parts.

However, the closed part 16 of the bracket 10 of the embodiment obtained by one-piece molding is obtained by so-called "shrink flanging". Usually, a part worked by shrink flanging becomes greater in thickness than before working. For this reason, for example, if comparing the thickness t1 of the base part 12 and the thickness t2 of the closed part 16 which were worked from a member of the originally same thickness, t2>t1 stand. In the bracket 10 of the present embodiment obtained by one-piece molding, by satisfying the relation (7), it is possible to sufficiently secure the thickness of the closed part 16. As a result, it is possible to further suppress out-of-plane deformation of the side parts 14, 14 in the first direction D1 and in turn possible to further raise the rigidity of the bracket 10 as a whole.

Note that when the thicknesses t1, t2 satisfy the relation $$t2 \geq 1.05 \times t1 \tag{8}$$

the above action and effect can be exhibited at a further higher level. This is preferable on this point.

Further, when the thicknesses t1, t2 satisfy the relation $$t2 \geq 1.10 \times t1 \tag{9}$$

the above action and effect can be exhibited at an extremely high level. This is preferable on this point.

Figure 2:
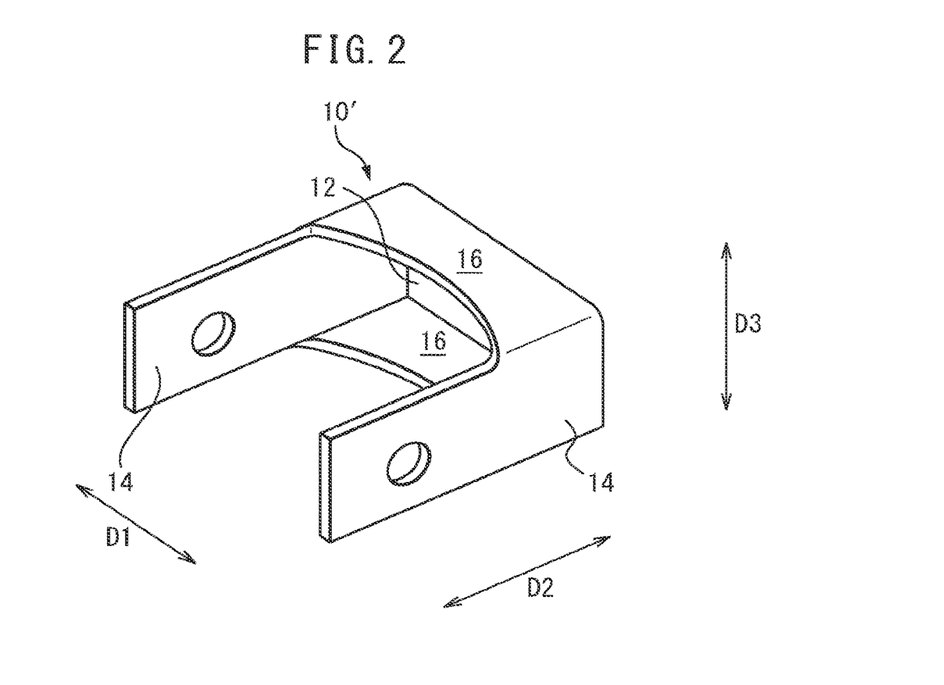
FIG. 2 is a perspective view showing a modification of the joint (bracket) shown in FIG. 1.

Furthermore, in the example shown in FIG. 1, the closed part 16 is formed at one side of the side parts 14 in the third direction D3, but as shown in the example shown in FIG. 2 (perspective view showing modification of bracket shown in FIG. 1), preferably the closed part 16 is formed at the two end parts in the third direction D3. Note that, in the example shown in FIG. 2, component elements the same as the example shown in FIG. 1 are assigned the same reference notations.

In the suspension use bracket 10' shown in FIG. 2, a pair of closed parts 16, 16 differing in position in the third direction D3 are formed between the pair of side parts 14, 14. That is, the closed parts 16, 16 are formed at the top end part and bottom end part of the pair of side parts 14, 14 in the third direction D3 as extended regions of the base part 12 and pair of side parts 14, 14.

In the example shown in FIG. 2, by forming the closed parts 16, 16 at the two end parts of the pair of side parts 14, 14 in the third direction D3, it is possible to suppress out-of-plane deformation of the side parts 14, 14 in the first direction D1 at a high level at the time when force is applied from the wheels etc. As a result, compared with the example shown in FIG. 1, it is possible to further increase the rigidity of the bracket 10' as a whole.

Method of Production of Joint (Suspension Link Bracket)

Next, referring to FIG. 3 to FIG. 5, an embodiment of the present invention (method of production of joint, in particular method of production of suspension link bracket) will be explained. Note that in the examples shown below, the joint (bracket) is formed by one-piece molding. Further, the first direction D1, second direction D2, and third direction D3 used in the following explanation of the method of production are the same directions as the directions D1, D2, and D3 used in the above section on the suspension link bracket.

Figure 3:
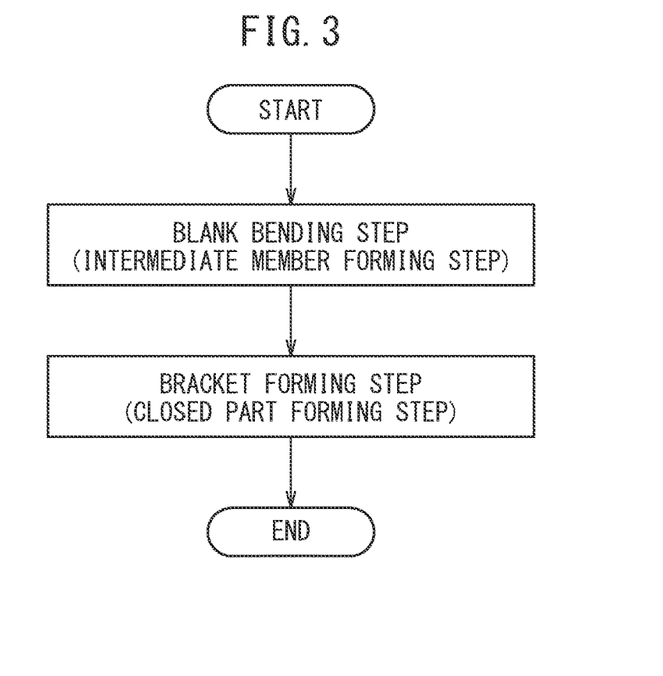
FIG. 3 is a flow chart showing a procedure in the method of production of a joint (bracket) according to an embodiment of the present invention.
Figure 4:
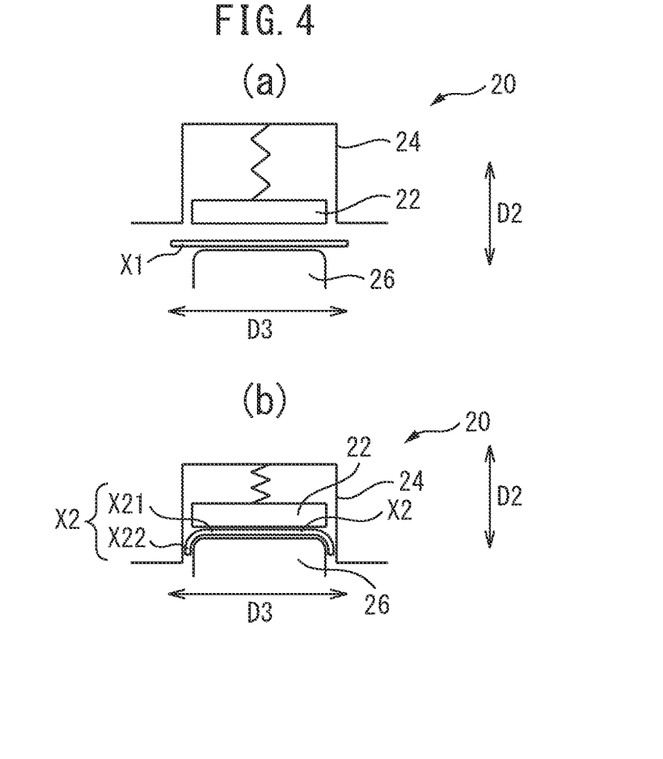

FIG. 3 is a flow chart showing the procedure of the method of production of a joint according to an embodiment of the present invention (suspension link bracket). As shown in the figure, the method of production of a joint according to the present embodiment includes a blank bending step and a bracket forming step.

Note that the blank used as the material of the bracket may be made of any known material so long as a metal sheet. As the metal sheet, a steel sheet (high strength steel sheet), stainless steel sheet, surface-treated steel sheet (hot dip galvanized steel sheet, zinc-aluminum plated steel sheet, etc.), and nonferrous metal sheet (aluminum alloy sheet and titanium sheet) etc. may be mentioned. Further, the blank is worked into a predetermined shape before the blank bending step shown below.

Blank Bending Step

This step is a step of bending at least one end part of a work, that is, a blank, in the third direction to one side in the second direction to form an intermediate member of an upside-down L-shape or upside-down U-shape when viewed by a side view. FIGS. 4(a) and 4(b) are side views showing an apparatus 20 used in the blank bending step. In the figure, FIG. 4(a) shows the state before bending, while FIG. 4(b) shows the state at the time of end of bending. Note that, the example shown in FIGS. 4(a) and 4(b) is an example of bending the two end parts in the third direction of a blank comprised of a metal sheet to one side in the second direction to form an intermediate member of an upside-down U-shape when seen by a side view.

The apparatus 20 is a press-forming apparatus for bending provided with a die 24 to which a pad 22 is attached movably in the clamping direction and a punch 26.

Using the apparatus 20 of the above configuration, in the present step, first, as shown in FIG. 4(a), the blank X1 is set at the apparatus 20, then the blank X1 is clamped between the pad 22 attached to the die 24 to be able to move in the clamping direction (second direction D2) and the punch 26.

Next, as shown in FIG. 4B, the die 24 is made to descend whereby the two end parts of the blank X1 in the third direction D3 are bent by the die 24 to one side in the second direction D2 (in the figure, the lower side). Due to this, an intermediate member X2 of an upside-down U-shape when viewed by a side view having a main body X21 (corresponding to mainly base part 12 and side parts 14 of FIG. 1) and a pair of flanges X22, X22 connected to the main body X21 (corresponding to mainly closed part 16 of FIG. 1) is obtained.

Bracket Forming Step

This step is a step of bending the two end parts in the first direction D1 of the intermediate member X2 obtained in the blank bending step to the one side in the second direction (that is, the side bending the two end parts of the blank in the third direction in the blank bending step). FIG. 5 is a perspective view showing an apparatus used in the bracket forming step.

Figure 5:
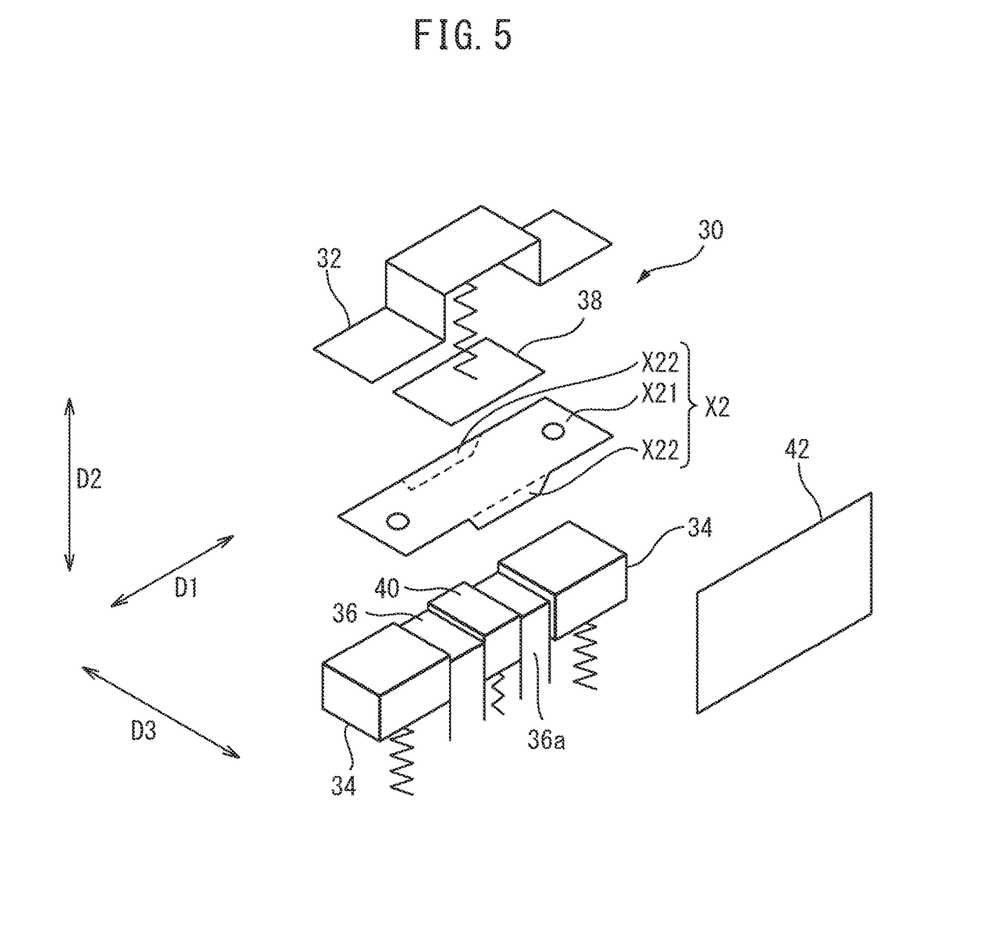
FIG. 5 is a perspective view showing an apparatus used in a bracket forming step.

The apparatus 30, as shown in FIG. 5, is provided with a die 32 constraining and holding the two end parts of the intermediate member X2 in the first direction D1, a blank holder 34, a punch 36, a pad 38 supported at the die 32 to be able to move in the clamping direction, and an inner pad 40 supported at the punch 36 to be able to move in the clamping direction and further is provided with an out-of-plane deformation suppressing tool 42 arranged facing a side surface 36a of the punch 36.

Here, the die 32, blank holder 34, punch 36, pad 38, inner pad 40, and out-of-plane deformation suppressing tool 42 used may all be of any types so long as ones used in general press-forming apparatuses using drawing operations etc.

Using an apparatus 30 of such a configuration, in the present step, first the top surface of the blank holder 34 and the top surface of the inner pad 40 are positioned at the slightly upper side in the second direction D2 from the top surface of the punch 36. In that state, the intermediate member X2 is set on these members 34, 40. When setting the intermediate member X2, the flanges X22, X22 are positioned at the further outside in the third direction D3 from the two outermost parts of the members 34, 36, and 40 in the same direction D3 so that only the main body X21 contacts the top surface of the blank holder 34 and the top surface of the inner pad 40. Note that, the out-of-plane deformation suppressing tool 42 is arranged facing the side surface 36a of the punch 36 considering a predetermined clearance from the side surface 36a.

Next, the pad 38 attached to be able to move with respect to the die 32 in the clamping direction (second direction D2) and the blank holder 34 and inner pad 40 are used to clamp the intermediate member X2.

Further, by making the die 32 move to one side in the second direction D2 (lower side of FIG. 5) (descend), the two end parts of the intermediate member X2 in the first direction D1 are bent by the die 32 to one side in the second direction D2 (lower side of FIG. 5).

At the initial stage of descent of the die 32, only the blank holder 34 descends—the inner pad 40 does not descend. Due to this, the strain generated at the bent parts can be reduced as much as possible and the occurrence of wrinkles at the bent parts can be suppressed. This effect is due to the inclusion of the inner pad 40 in shrink flanging. Due to this, it is possible to keep the wall thickness of the bracket from excessively differing locally and to obtain uniform rigidity of the bracket at all locations.

At the latter stage of descent of the die 32, the inner pad 40 also descends. In the state where the top surfaces of the members 36, 40 match, the two end parts of the intermediate member X2 in the first direction D1 are bent to their final positions. In this way, the bent parts in the intermediate member X2 become mainly the side parts 14 of FIG. 1, while the unbent part becomes mainly the base part 12 of FIG. 1. Due to the above, a bracket of a predetermined shape shown in FIG. 1 provided with a base part 12, side parts 14, 14, and closed part 16 is obtained.

According to the method of production of the suspension link bracket shown above, when bending the blank X1 to obtain the intermediate member X2, it is possible to use so-called shrink-flanging to obtain a bracket 10 provided with a closed part 16 such as shown in FIG. 1.

Such a bracket is increased in thickness at the closed part 16 worked by shrink flanging from the base part 12 or the side parts 14, 14. In other words, the thickness of the closed part 16 becomes larger than the thickness of the base part 12 or the thicknesses of the side parts 14, 14. Therefore, in the method of production of a suspension link bracket according to the present invention, it is possible to increase the rigidity without uniformly increasing the wall thickness of the bracket itself by the form of the closed part (increase in thickness) between the pair of side parts.

EXAMPLES

Below, Examples 1 and 2 will be used to demonstrate the advantageous effects of the present invention.

Example 1

Regarding Effect of Closed Part on Bracket Rigidity

First, a high strength steel sheet (thickness: 3.0 mm, grade: 440 MPa class) was used to prepare suspension link brackets by various methods. The effects of their structures (presence of closed part) on the bracket rigidity were evaluated.

Specifically, a suspension link bracket of the Invention Example A was prepared using the apparatus shown in FIGS. 4(a) and 4(b) and FIG. 5 by a predetermined method of production of the present application (including steps shown in FIG. 3). Further, a conventional apparatus was used to shape parts of the suspension link bracket shown in FIG. 1 other than the closed part 16, a closed part 16 was separately prepared, and then these were welded together to prepare the bracket of Invention Example B. As opposed to this, an ordinary press machine was used to shape the parts of the suspension link bracket shown in FIG. 1 other than the closed part 16 to obtain a bracket of Conventional Example 1 not provided with a closed part.

Further, the bracket of each test example was bolted in place using the pair of fastening holes 14H shown in FIG. 1. In the state with the base part 12 fastened in place, the pair of side parts 14, 14 were given 10 kN of compressive force in the second direction D2. The amount of displacement of a center of a fastening hole 14H in the first direction D1 was measured. Further, the value of the compressive force divided by the amount of displacement was calculated as the rigidity value. The results are shown in Table 2.

TABLE 2

|  | Invention Example A | Invention Example B | Conventional Example 1 |
| --- | --- | --- | --- |
| Method of production | One-piece molding including also closed part | Bending other than closed part and welding closed part | Bending other than closed part |
| Presence of closed part | Yes | Yes | No |
| Rigidity value (kN/mm) | 94.3 | 94.3 | 68.9 |

According to Table 2, it is learned that the rigidity value is higher in both Invention Examples A, B compared with Conventional Example 1. This means that regardless of the method of production, when there is a closed part, the rigidity value can be effectively raised.

Example 2

Regarding Effect of Thickness and Number of Closed Parts on Bracket Rigidity

Next, using a high strength steel sheet (sheet thickness 3.0 mm, grade 440 MPa class) as a blank, suspension link brackets were prepared by the conventional method and one-piece molding method of the present application.

Specifically, using the apparatus shown in FIGS. 4(a) and 4(b) and FIG. 5, suspension link brackets of Invention Example 1 and Invention Example 3 shown in FIG. 1 or FIG. 2 were prepared by a predetermined method of production of the present application (including steps shown in FIG. 3). Further, using a usual press machine, the parts other than the closed part 16 of the suspension link bracket shown in FIG. 1 were formed to prepare a suspension link bracket of Conventional Example 2 not provided with a closed part. Further, the suspension link bracket of Invention Example 2 is comprised of the suspension link bracket of Conventional Example 2 to which a closed part of a sheet thickness of 3.3 mm is joined by welding. Note that, the other design conditions of the bracket structure of each test example were as shown in the following Table 3.

TABLE 3

|  | Conventional Example 2 | Invention Example 1 | Invention Example 2 | Invention Example 3 |
| --- | --- | --- | --- | --- |
| Length L1 shown in FIG. 1 or FIG. 2 (mm) | 49 | 49 | 49 | 49 |
| Length L2 shown in FIG. 1 or FIG. 2 (mm) | — | 14.6 | 14.6 | 14.6 |
| Ratio (L2/L1) | 0 | 0.3 | 0.3 | 0.3 |
| Dimension W1 shown in FIG. 1 or FIG. 2 (mm) | 51 | 51 | 51 | 51 |
| Dimension W3 shown in FIG. 1 or FIG. 2 (mm) | 35 | 35 | 35 | 35 |
| Presence of closed part 16 shown in FIG. 1 or FIG. 2 | No | Yes (one side in direction D3) | Yes (one side in direction D3) | Yes (both sides in direction D3) |
| Sheet thickness of closed part 16 shown in FIG. 1 or FIG. 2 (mm) | — | 3.15 | 3.30 | 3.15 |
| Rigidity value of bracket obtained (kN/mm) | 68.9 | 94.3 | 96.1 | 183.3 |

Further, the bracket of each of the test examples was bolted using the pair of fastening holes 14H shown in FIG. 1 to fasten the base part 12 in place. In that state, the pair of side parts 14, 14 were given a 10 kN compressive force in the second direction D2. In that case, the amount of displacement of a center of a fastening hole 14H in the first direction D1 was measured. Further, the value of the compressive force divided by the displacement was calculated as the rigidity value. The results are described together in Table 3.

As clear from Table 3, it is learned that the joints (brackets) of Invention Examples 1 to 3 falling in the technical scope of the present invention improved in the form of the closed part were all improved in rigidity of the joint compared with the joints (brackets) of the conventional examples not falling in the technical scope of the present invention without uniformly increasing the wall thickness of the joint.

REFERENCE SIGNS LIST 10, 10'. suspension link bracket
12. base part
14. side parts
14H. fastening hole
16. closed part
20, 30. apparatus
22, 38. pad
24, 32. die
26, 36. punch
34. blank holder
36a. side surface of punch 36
40. inner pad
42. out-of-plane deformation suppressing tool
D1. first direction
D2. second direction
D3. third direction
E. longitudinal direction end part of intermediate member X2
L1. length from base part side end part to center position of fastening hole in second direction of side part
L2. smallest length of closed part in second direction S. space inside bracket 10
R1. boundary part (ridgeline part) between base part 12 and side part 14
R2. boundary part (ridgeline part) between side part 14 and closed part 16
R3. boundary part (ridgeline part) between closed part 16 and base part 12
r1. radius of curvature of inner circumferential surface of ridgeline part R1
r2. radius of curvature of inner circumferential surface of ridgeline part R2
r3. radius of curvature of inner circumferential surface of ridgeline part R3
t1. thickness of base part 12
t2. thickness of closed part 16
W1. dimension between pair of side parts 14, 14 in first direction
W3. dimension of base part 12 in third direction
X1. blank
X2. intermediate member
X21. main body
X22. flange

The invention claimed is:

1. A joint comprising:
a base part,
a pair of side parts respectively extending from two end parts of the base part in a first direction to the same side of a second direction vertical to the first direction and formed with fastening holes at center parts in a third direction vertical to both of the first direction and second direction, and
a closed part formed between the pair of side parts as an extended region of the base part and the pair of side parts at least at one end part in the third direction,
wherein a thickness t1 of the base part and a thickness t2 of the closed part satisfy the relationship $t2>t1$, and the joint is formed by one-piece molding.

2. The joint according to claim 1, wherein a length L1 from a base part side end part of the side part in the second direction to a center position of the fastening hole and a smallest length L2 of the closed part in the second direction satisfy the relationship:

$0.1 \times L1 < L2 < 1.0 \times L1$.

3. The joint according to claim 2, wherein the closed part is formed at the two end parts of the side parts in the third direction.

4. The joint according to claim 1, wherein the closed part is formed at the two end parts of the side parts in the third direction.

5. A method of production of the joint according to claim 1, comprising:
a blank bending step of bending at least one end part in the third direction of a blank comprised of a metal sheet to one side in the second direction to form an intermediate member of an upside down L-shape or upside down U-shape viewed from the side and
a joint shaping step of using press-forming die comprising a die provided with a pad for pressing the intermediate member, a punch arranged facing the die and provided with an inner pad supported to be able to move in a clamping direction, and an out-of-plane deformation suppressing tool of the closed part arranged facing a side surface of the punch so as to bend the two end parts of the intermediate member in the first direction to the one side of the second direction.

* * * * *